United States Patent [19]

Del'Acqua

[11] 4,341,495

[45] Jul. 27, 1982

[54] CONTAINER CORNER POST LOCKING ASSEMBLY

[76] Inventor: Raymond M. Del'Acqua, 26 Evy Ct., Sayville, N.Y. 11782

[21] Appl. No.: 176,057

[22] Filed: Aug. 7, 1980

[51] Int. Cl.³ .......................... B60P 1/64; B60P 7/13; B61D 45/00
[52] U.S. Cl. ....................................... 410/78; 220/1.5; 294/67 DA; 294/81 SF; 410/69; 410/77; 410/83
[58] Field of Search .................... 220/1.5; 294/81 SF, 294/67 DA; 410/69, 77, 78, 82, 83, 84

[56] References Cited

U.S. PATENT DOCUMENTS

| 3,456,829 | 7/1969 | Glassmeyer | 220/1.5 |
| 3,684,122 | 8/1972 | Bonomi | 220/1.5 |
| 3,734,308 | 5/1973 | Pasternack | 410/77 X |
| 3,892,436 | 7/1974 | Fathauer | 410/82 X |
| 3,980,185 | 9/1976 | Cain | 220/1.5 X |

*Primary Examiner*—Joseph F. Peters, Jr.
*Assistant Examiner*—Howard Beltran
*Attorney, Agent, or Firm*—Richard L. Miller

[57] ABSTRACT

A corner post locking assembly for locking together two cargo containers placed one upon another; the assembly including an upper activating unit and a bottom twist lock and shear pin unit installed inside each vertical corner of the container; the upper activating unit being engagable by a bayonet of a hydraulically powered, container handling, spreader; the bayonet turning the upper activating unit which thus transmits rotation to the bottom twist lock and locks the shear pin to a container therebelow.

1 Claim, 4 Drawing Figures

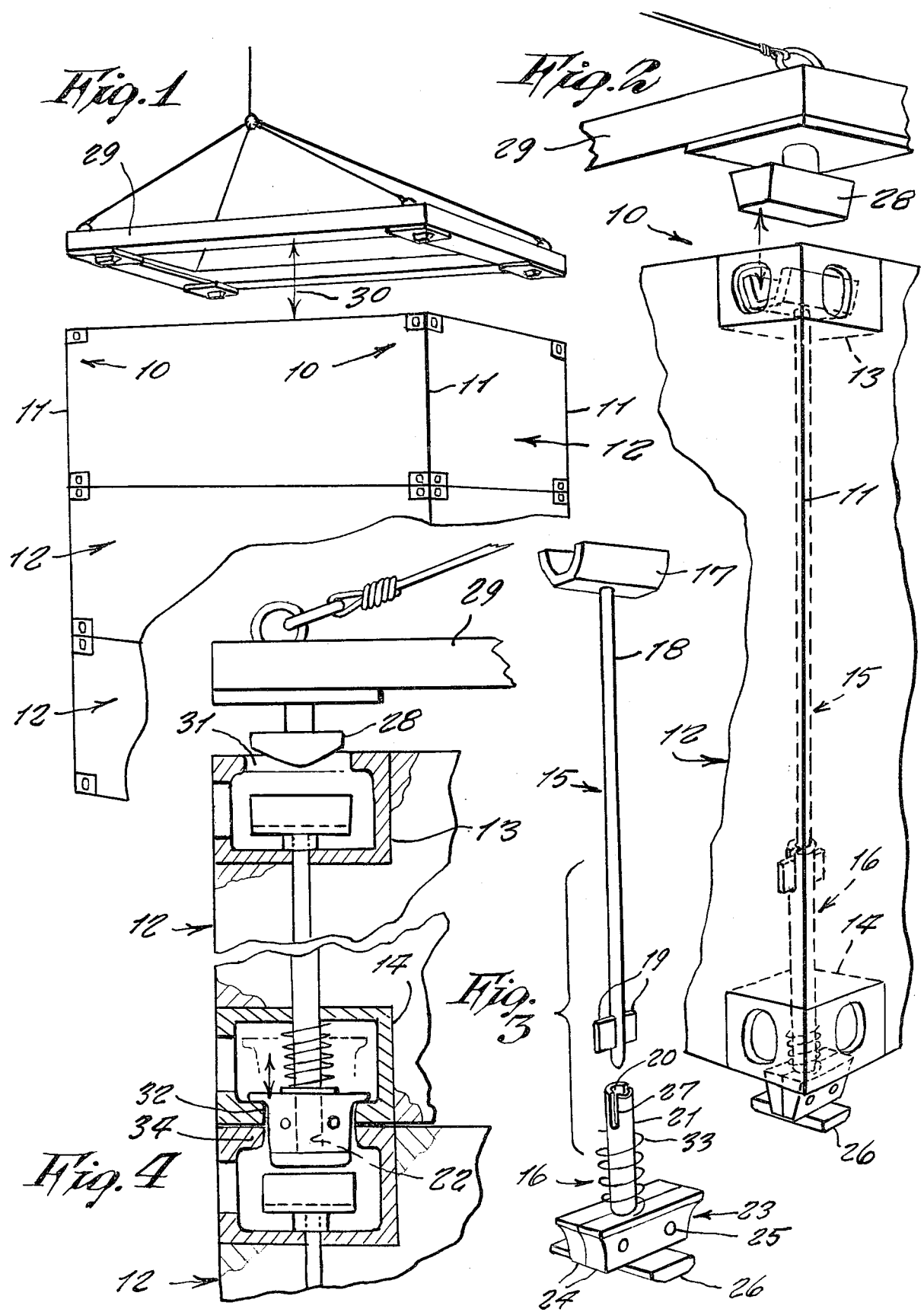

4,341,495

CONTAINER CORNER POST LOCKING ASSEMBLY

BACKGROUND OF THE INVENTION

This invention relates to cargo container locks.

Heretofore numerous methods have been developed for locking stacked cargo containers together in order to prevent shifting and falling down during transportation on ships, railroads or trucks. None of these methods have heretofore proved to be ideal. Workmen have had to climb up the containers so as to put locking equipment in place; loose twist locks and pin locks were used; loose gear got lost, and considerable manpower time was required in this dangerous work. This situation therefore has been for a long time in need of an improvement.

SUMMARY OF THE INVENTION

Accordingly a principal object of the present invention is to provide a container corner post locking assembly which permits stacked cargo containers to be locked together by power supplied by a spreader; which eliminates the use of loose twist locks, pin locks and the like, and which eliminates the necessity for men to climb containers in order to put locking equipment in place.

Another object accordingly is to provide a container corner post locking assembly which eliminates the necessity to manually lock twist locks or pin locks; and which includes fail safe features, such as the spreader not being able to be removed from the container corner fitting until the bayonet is in a locked position, thus promoting safety.

Another object is to provide a container corner post locking assembly having the additional advantages of containers being locked together in cell guides, eliminates the problem of losing loose gear, allows the locking of twenty foot containers at the midpoints when two such containers are stowed within a forty foot space, reduces manpower requirements, reduces operational turn around time of vessels and provides positive vertical locking of containers to railroad flat cars, truck or the deck of a ship.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures on the drawings are briefly described as follows:

FIG. 1 is a perspective view of the invention incorporated in a stack of containers for use with a hydraulic powered spreader.

FIG. 2 is an enlarged view of one corner thereof.

FIG. 3 is a perspective view of the key unit used in the structure of FIG. 2, and shown alone.

FIG. 4 is a further enlarged cross sectional view of the structure of the invention.

DETAILED DESCRIPTION OF PREFERRED EMBODIMENT

Referring now to the drawing in greater detail, the reference numeral 10 represents a corner post locking assembly according to the present invention, and which is installed within each vertical corner 11 of a cargo container 12.

Each corner post locking assembly includes a hollow metal box 13 at an upper end and a hollow metal box 14 at a lower end of the corner 11. It also includes an upper actuating unit 15 that extends downwardly from the box 13, and a bottom twist lock and shear pin assembly 16 that extends upwardly from the box 14, so that the lower end of unit 15 connects to the assembly 16 in order to activate it between a locked and unlocked position relative to a container therebelow.

The upper activating unit 15 includes a U-shaped saddle 17 affixed to an upper end of a long shaft 18 which at its lower end is formed into a key by including opposite, sideward, flat plate wings 19. A lower end of the shaft below the wings, is rounded, so as to easily find an entry opening 20 in an upper end of a tubular shaft 21 of the assembly 16 to form a unitary shearable shaft. The shaft extends through a central hole 22 formed in a shear pin or body member 23 comprised of right and left halves 24 secured together by bolts 25. A latch 26 affixed to a lower end of the shaft 21 is positioned adjacent an underside of the shear pin. The wings 19 slide into slits 27 at an upper end of tubular shaft 21.

The saddle is housed within the box 13, while the shear pin and latch are normally housed within the box 14 when the invention is in an unlocked position.

The present invention is activated by a bayonet 28 under each corner of a hydraulically powered, container handling, spreader 29 that is lowered upon a top of the cargo container, as indicated by arrow 30 in FIG. 1. The bayonet is lowered through a top opening 31 of the box 13 so as to engage in the saddle 17. The shear pin and latch are downwardly pushed through a lower opening 32 of the box 14 and into the opening 31 of box 13 of a container therebelow when upper container was placed upon.

The shear pin and latch are generally rectangular and the opening 31 is also correspondingly rectangular.

In an unlocked position, the shear pin and latch protrude downwardly through the openings 32 and 31 due to action of a compression coil spring 33. However when the latch is rotated a quarter turn by means of the spreader bayonet, the ends of the latch moves underneath the top wall 34 of the box 13 of the lower container, thus locking the containers together where the shear pin or body member will shear when the containers are separated by lateral transportation forces.

A further one quarter turn of the bayonet, unlocks the containers.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. A container corner post locking assembly for a cargo container comprising a hollow metal box affixed at the upper and lower ends of each corner of said container; an activating unit extending downward from each said upper end metal box; and a bottom twist lock and shear pin unit extending upwardly from each said lower end metal box and connected to said activating unit; each said activating unit comprising a saddle having an open upwardly facing reception well, said saddle being positioned within an upper metal box, an elongated shaft extending downwardly from the bottom surface of said saddle, and said elongated shaft having an end remote from said saddle and having a first and second flat wing plate extending in opposite directions from said remote end of said elongated shaft; each said bottom twist lock and shear pin unit comprising a secondary shaft having a greater diameter than said elongated shaft of said activating unit, said secondary shaft having an upper end having a hollow opening formed therein for receiving therein said remote end of said elongated shaft, said upper end of said secondary shaft further having a pair of oppositely disposed slots in which slide said first and second flat plate wings to form a shearable vertical unitary shaft for movement of said secondary shaft relative to said elongated shaft, an elongated shear body member having an aperture formed therethrough, said secondary shaft having a lower end inserted through said aperture of said shear body member such that said lower end of said secondary shaft extends below the bottom face of said shear body member, and a rectangularly-shaped latch member affixed to said lower end of said secondary shaft, said latch member and said shear body member moving together along with the movement of said lower end of said secondary shaft, and a compression spring mounted about the lower portion of said secondary shaft, said compression spring having a first end in abutting relationship against said first and second flat plate wings, and a second end in abutting relationship with the upper face of said shear body member so as to urge said shear body member downwardly into the upper metal box of a container positioned therebelow whereby said shear body member will shear after seating in said upper metal box when said containers are separated by lateral transportation forces; and each said upper metal box having an enlarged opening formed in the top face thereof through which said saddle and therefore said elongated shaft is rotated by a container handling spreader and through which said latch member and said shear body member extend when pushed downwardly therein; each said lower metal box having an enlarged opening in the bottom face thereof, which enlarged opening of said lower metal box is of the same size and shape as said enlarged opening of said upper metal box to provide a mating relationship between a lower and upper enlarged opening to form a continuous passageway therebetween; said shear body member having a peripheral edge flange of greater dimensions than said enlarged opening of said upper metal box whereby said shear body member rests upon lower face of said lower metal box above said enlarged opening of said lower metal box to prevent passage of said shear body member through said enlarged openings, said shear body member having a rectangular cross-sectional shape and positioned on said secondary shaft parallel with respect to said saddle; each said enlarged opening of said upper and lower metal boxes having a size greater than said rectangular cross-sectional shear body member so that said shear body member extends downwardly in said enlarged openings to expose said latch member within said lower metal box, said latch member locking said containers together upon rotation of said elongated and secondary shafts through a right angle, said latch member having a rectangular-shaped cross-section such that the longer dimension is greater than the longer dimension of said shear body member to lock said containers together.

* * * * *